US008724970B2

(12) United States Patent
Johnson et al.

(10) Patent No.: US 8,724,970 B2
(45) Date of Patent: May 13, 2014

(54) METHOD AND APPARATUS TO SEARCH VIDEO DATA FOR AN OBJECT OF INTEREST

(75) Inventors: Alexander Steven Johnson, Erie, CO (US); Kurt Heier, Westminster, CO (US)

(73) Assignee: Verint Systems Inc., Santa Clara, CA (US)

( * ) Notice: Subject to any disclaimer, the term of this patent is extended or adjusted under 35 U.S.C. 154(b) by 97 days.

(21) Appl. No.: 12/916,006

(22) Filed: Oct. 29, 2010

(65) Prior Publication Data

US 2011/0103773 A1 May 5, 2011

Related U.S. Application Data

(60) Provisional application No. 61/256,203, filed on Oct. 29, 2009, provisional application No. 61/257,006, filed on Nov. 1, 2009.

(51) Int. Cl.
*H04N 5/93* (2006.01)

(52) U.S. Cl.
USPC .......... 386/290

(58) Field of Classification Search
USPC .......... 348/143, 152, 153, 169; 382/103
See application file for complete search history.

(56) References Cited

U.S. PATENT DOCUMENTS

2002/0196330 A1* 12/2002 Park et al. .......... 348/49
2004/0125207 A1* 7/2004 Mittal et al. .......... 348/169
2004/0175058 A1* 9/2004 Jojic et al. .......... 382/305
2006/0177145 A1* 8/2006 Lee et al. .......... 382/255
2006/0239645 A1* 10/2006 Curtner et al. .......... 386/95

* cited by examiner

*Primary Examiner* — Thai Tran
*Assistant Examiner* — Sunghyoun Park
(74) *Attorney, Agent, or Firm* — Meunier Carlin & Curfman

(57) ABSTRACT

A method of searching for objects of interest within captured video comprising capturing video of a plurality of scenes, storing the video in a plurality of storage elements, and receiving a request to retrieve contiguous video of an object of interest that has moved through at least two scenes of the plurality of scenes. In response to the request, searching within a first storage element of the plurality of storage elements to identify a first portion of the video that contains the object of interest within a first scene of the plurality of scenes, processing the first portion of the video to determine a direction of motion of the object of interest, selecting a second storage element of the plurality of storage elements within which to search for the object of interest based on the direction of motion, searching within the second storage element to identify a second portion of the video that contains the object of interest within a second scene of the plurality of scenes, and linking the first portion of the video with the second portion of the video to generate the contiguous video of the object of interest.

24 Claims, 7 Drawing Sheets

METHOD AND APPARATUS TO SEARCH VIDEO DATA FOR AN OBJECT OF INTEREST

RELATED APPLICATIONS

This application is related to and claims priority to U.S. Provisional Patent Application No. 61/256,203 entitled "Method and Apparatus to Search Video Data for an Object of Interest" filed on Oct. 29, 2009, and U.S. Provisional Patent Application No. 61/257,006 entitled "Method and Apparatus to Search Video Data for an Object of Interest" filed on Nov. 1, 2009. Both provisional patent applications are hereby incorporated by reference in their entirety.

TECHNICAL BACKGROUND

Digital cameras are often used for security, surveillance, and monitoring purposes. Camera manufacturers have begun offering digital cameras for video recording in a wide variety of resolutions ranging up to several megapixels. These high resolution cameras offer the opportunity to capture increased image detail, but potentially at a greatly increased cost. Capturing, processing, manipulating, and storing these high resolution video images requires increases central processing unit (CPU) power, bandwidth, and storage space. These challenges are compounded by the fact that most security, surveillance, or monitoring implementations make use of multiple cameras. These multiple cameras each provide a high resolution video stream which the video system must process, manipulate, and store.

System designers have multiple challenges when designing and building processing solutions for these types of video applications. Among other capabilities, the systems must be cost effective and allow operators to readily locate the video in which they are interested. Designers must leverage available technology to capture and store selected video rather than simply processing and storing all of the video which is available for capture. Designers must also provide tools which make it easier for operators to locate the particular video in which they are interested based on the task being performed. In the past, video analysis algorithms, video compression algorithms, and video storage methods have all been designed and developed independently. It is desirable to store and process the video using methods which are optimized based on making the ultimate uses of the video more efficient or effective.

In security, surveillance, and monitoring applications, operators are often interested in viewing video of a person, vehicle, or object which is moving throughout a specified area. Often, the area is large enough that video coverage of the area requires several, tens, or even hundreds of cameras. The movement of the person, vehicle, or object throughout the area is captured by different cameras at different points in the path of movement. Consequently, the video of interest may be spread across video streams which have been captured by multiple cameras. In order to view a single continuous video of the movement of the person or object throughout the various areas, several things must occur. First, it must be determined which of the video streams contain the information of interest. Next, the location of the video of interest within those video streams must be identified. Finally, the video segments of interest must be spliced or linked together in the appropriate order to create a contiguous video of the person or object of interest which can be viewed in a continuous manner.

OVERVIEW

In various embodiments, systems and methods are disclosed for operating a video system to search for objects of interest within captured video. In an embodiment, a method of searching for objects of interest within captured video includes capturing video of multiple scenes, storing the video in multiple storage elements, and receiving a request to retrieve contiguous video of an object of interest that has moved through at least two of the scenes. The method further includes, in response to the request, searching within a first storage element to identify a first portion of the video that contains the object of interest within a first scene, processing the first portion of the video to determine a direction of motion of the object of interest, selecting a second storage element within which to search for the object of interest based on the direction of motion, searching within the second storage element to identify a second portion of the video that contains the object of interest within a second scene, and linking the first portion of the video with the second portion of the video to generate the contiguous video of the object of interest.

In another embodiment, the method of selecting the second storage element of the plurality of storage elements within which to search for the object of interest based on the direction of motion is further based on a probability of the object of interest appearing in the second scene.

In another example embodiment, the method includes using a timestamp in the first portion of the video to identify a location in the second portion of the video.

In yet another embodiment, a video system for searching for object of interest with captured video is provided. The video system contains a storage system and a video processing system. The storage system comprises multiple storage elements. The video processing system is configured to capture video of a plurality of scenes, store the video in the plurality of storage elements, and receive a request to retrieve contiguous video of an object of interest that has moved through at least two scenes of the plurality of scenes. The video system is further configured to search within a first storage element of the plurality of storage elements to identify a first portion of the video that contains the object of interest within a first scene of the plurality of scenes, process the first portion of the video to determine a direction of motion of the object of interest, select a second storage element of the plurality of storage elements within which to search for the object of interest based on the direction of motion, search within the second storage element to identify a second portion of the video that contains the object of interest within a second scene of the plurality of scenes, and link the first portion of the video with the second portion of the video to generate the contiguous video of the object of interest.

DETAILED DESCRIPTION

Figure 1:
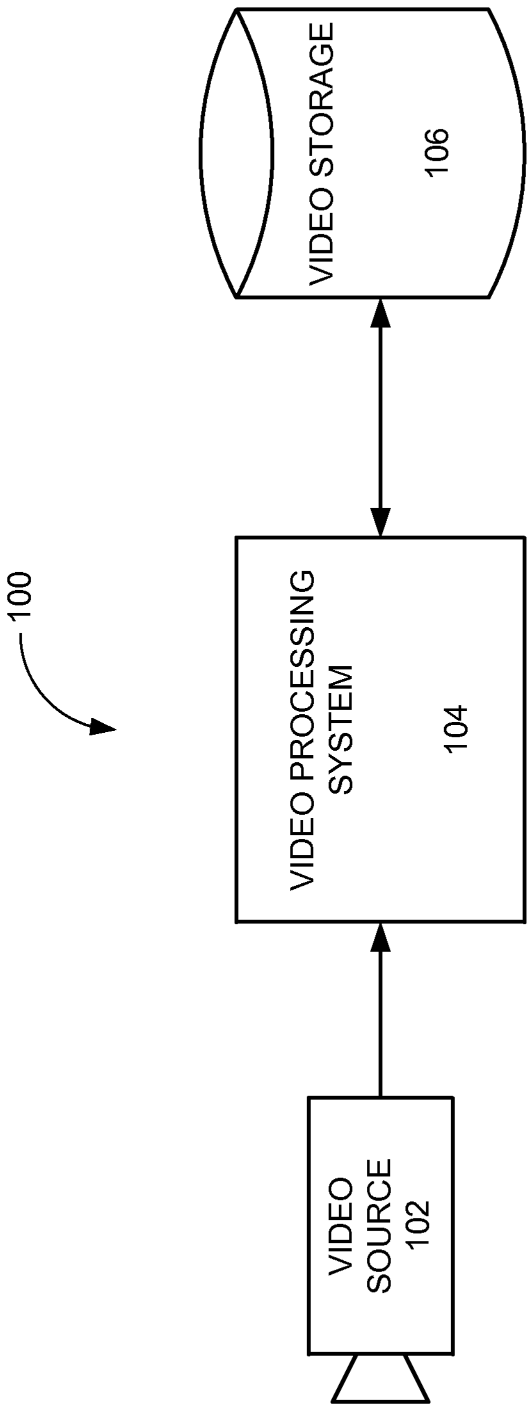
FIG. 1 illustrates a block diagram of an example of a video system.

FIGS. 1-7 and the following description depict specific embodiments of the invention to teach those skilled in the art how to make and use the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will also appreciate that the features described below can be combined in various ways to form multiple variations of the invention. As a result, the invention is not limited to the specific embodiments described below, but only by the claims and their equivalents.

In some video systems, multiple cameras are used to provide video coverage of large areas with each camera covering a specified physical area. Even though the video streams from these multiple cameras may be received or processed by the same video system, the video streams from each individual camera are typically still stored separately for later searching and retrieval. Each video stream may be compressed or processed in some other manner even though relationships or links between the video streams are not established.

When a person, vehicle, or object of interest is moving through an area which is monitored by multiple cameras, all of the resulting video of that person, vehicle, or object is spread across video streams associated with each of those cameras. It is often desirable to find the portions of each video stream which contain that movement and splice or link them together in the form of a contiguous video clip of the movement through the building or area. In order to do this, all of the video from all of the individual cameras must be searched to find the frames or segments with the person or object in them. This process can be both time consuming and CPU intensive. The burden of the processing requirements becomes even more problematic when such software is running on a general purpose personal computer or when video analytics processes are being executed remotely.

For example, if there are nine cameras recording nine different scenes, all nine video streams must be searched to identify frames or segments with the person or object in them. Then, the proper portions of each of those nine streams must be spliced or linked together in some manner in the proper order to produce a single contiguous video of the movement. Therefore, it is desirable to use methods of determining which portions of the video contain images of the person of interest. Knowing which portions of the video contain images of the person and avoiding searching through all of the video for those images may result in significant time, cost, and processing savings.

If a camera captures video of a person of interest and that person walks out of the scene covered by that camera on the east perimeter of that scene, it is desirable to identify the storage location of the portions of video from cameras which cover scenes to the east of the first camera. These storage locations are likely to contain video which includes the person. Searching this video first will likely allow the system or operator to avoid having to search storage locations containing video from cameras to the north, south, or west of the first camera. This reduction in the amount of video which must be searched for the object or person of interest results in higher throughput, faster response times, and may reduce processing requirements. In addition, it could result in crimes being solved more effectively and suspects being apprehended more efficiently.

In addition to knowing which portion of the video contains the images of interest, it is also desirable to know the sequence in which the images will appear in the video in order to make the process of extracting those segments and splicing or linking them together in the proper order even more efficient. It is also desirable to know approximately where the images of interest are within each of the video streams to further streamline the search process.

FIG. 1 illustrates video system 100. Video system 100 includes video source 102, video processing system 104, and video storage system 106. Video source 102 is coupled to video processing system 104, and video processing system 104 is coupled to video storage system 106. The connections between the elements of video system 100 may use various communication media, such as air, metal, optical fiber, or some other signal propagation path—including combinations thereof. They may be direct links, or they might include various intermediate components, systems, and networks.

In some embodiments, a large number of video sources may each communicate with video processing system 104. In the case of multiple video sources, the video system may suffer from bandwidth problems. Video processing system 104 may have an input port which is not capable of receiving full resolution, video streams from all of the video sources. In such a case, it is desirable to incorporate some video processing functionality within each of the video sources such that the total amount of video being received by video processing system 104 from all the video sources is reduced. An example of a video source which has the capability of providing this extra functionality is illustrated in FIG. 2.

Figure 2:
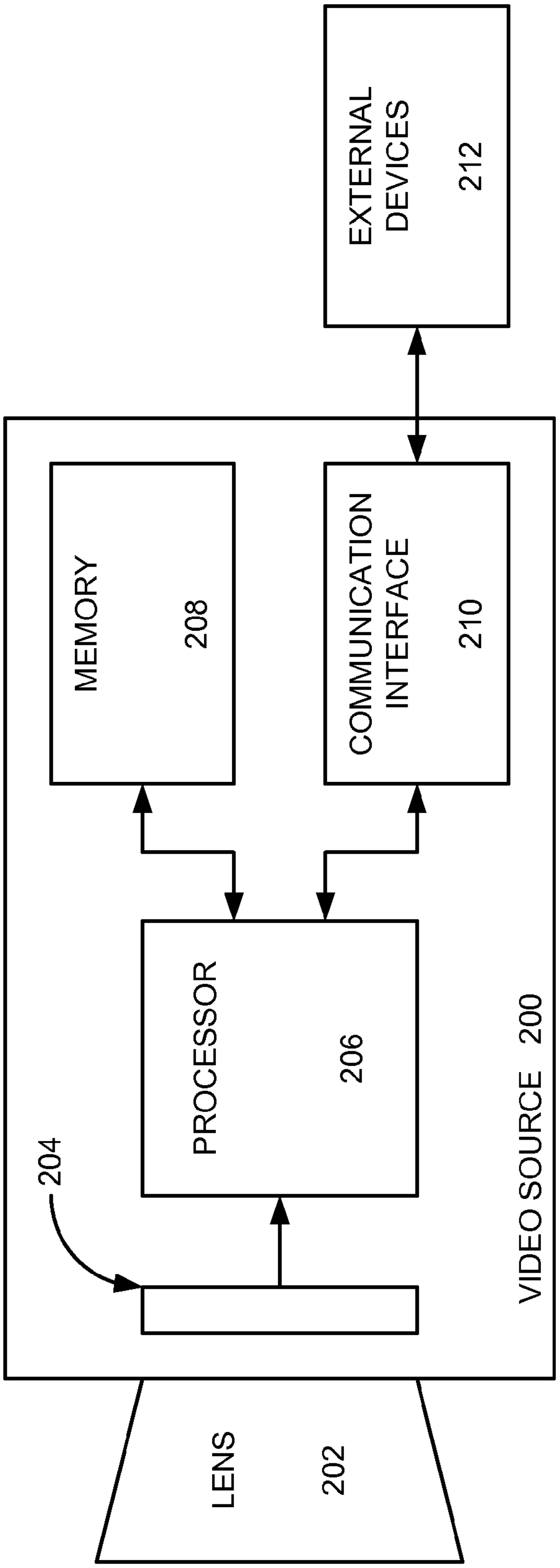
FIG. 2 illustrates a block diagram of an example of a video source.
Figure 3:
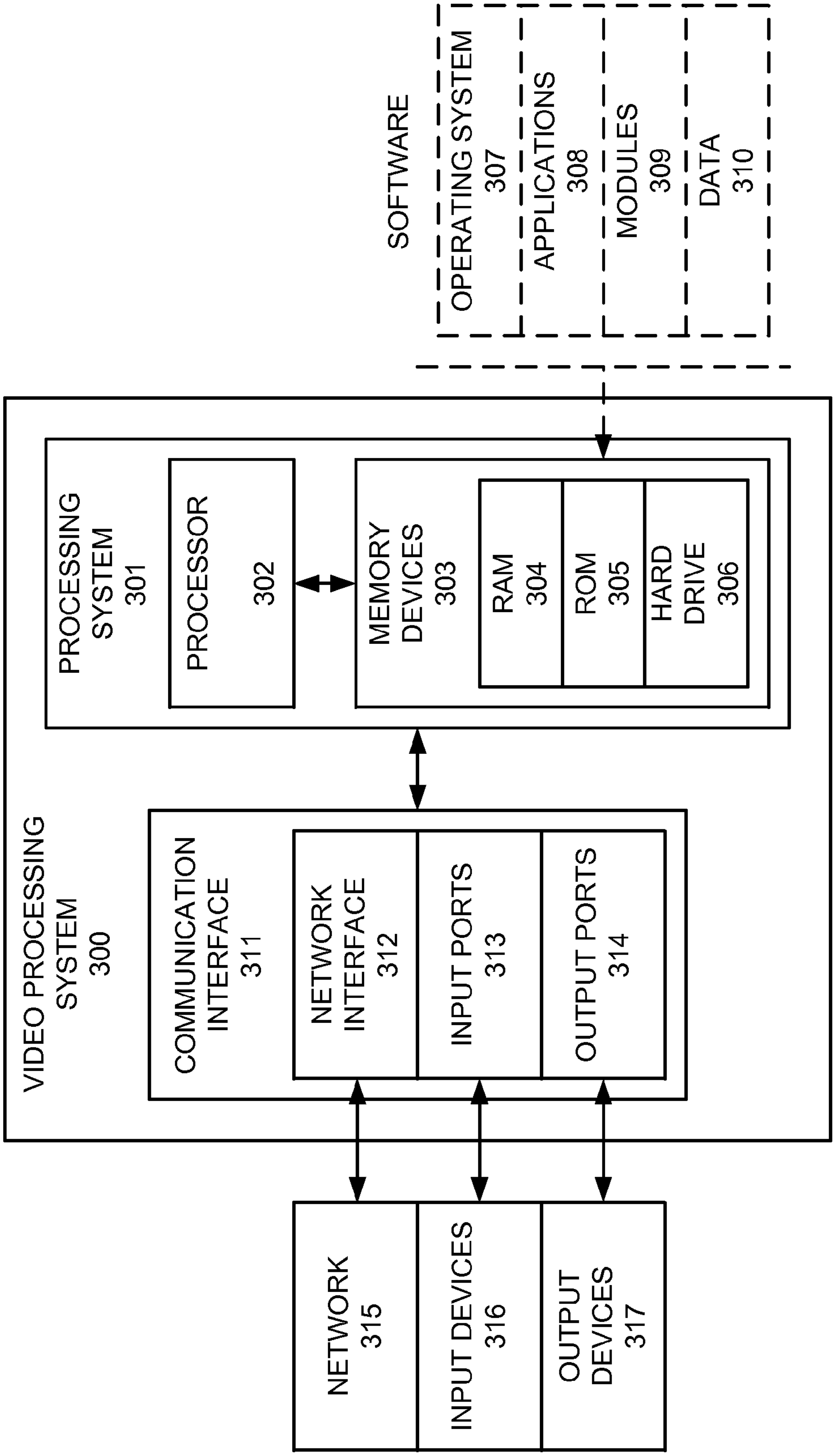
FIG. 3 illustrates a block diagram of an example of a video processing system.

FIG. 2 illustrates a video source 200 which is an example of a variation of video source 102 from FIG. 1. Video source 200 includes lens 202, sensor 204, processor 206, memory 208, and communication interface 210. Lens 202 is configured to focus an image of a scene on sensor 204. Lens 202 may be any type of lens, pinhole, zone plate, or the like able to focus an image on sensor 204. Sensor 204 then digitally captures these images and transfers them to processor 206 in the form of video. Processor 206 is configured to store some or all of the video in memory 208, process the video, and send the processed video to external devices 212 through communication interface 210. In some examples, external devices 212 may include video processing system 104, video storage system 106, or other devices.

In the example of FIG. 2, video source 200 captures video of an object through lens 202 and sensor 204. Processor 206 stores the video in memory 208. Processor 206 then processes the video to determine a direction of motion for the object, and processes the direction of motion to determine a second storage element to search for video containing the object. The processing may involve compressing, filtering, or manipulating the video in other ways in order to reduce the overall amount of video which is being stored or transmitted to external devices 212.

Various embodiments may include a video processing system, such as video processing system 104 or processor 206. Any of these video processing systems may be implemented on a video processing system such as that shown in FIG. 3. Video processing system 300 includes communication interface 311, and processing system 301. Processing system 301 is linked to communication interface 311 through a bus. Processing system 301 includes processor 302 and memory devices 303 that store operating software.

Communication interface 311 includes network interface 312, input ports 313, and output ports 314. Communication interface 311 includes components that communicate over communication links, such as network cards, ports, RF transceivers, processing circuitry and software, or some other communication devices. Communication interface 311 may be configured to communicate over metallic, wireless, or optical links. Communication interface 311 may be configured to use TDM, IP, Ethernet, optical networking, wireless protocols, communication signaling, or some other communication format—including combinations thereof.

Figure 4:
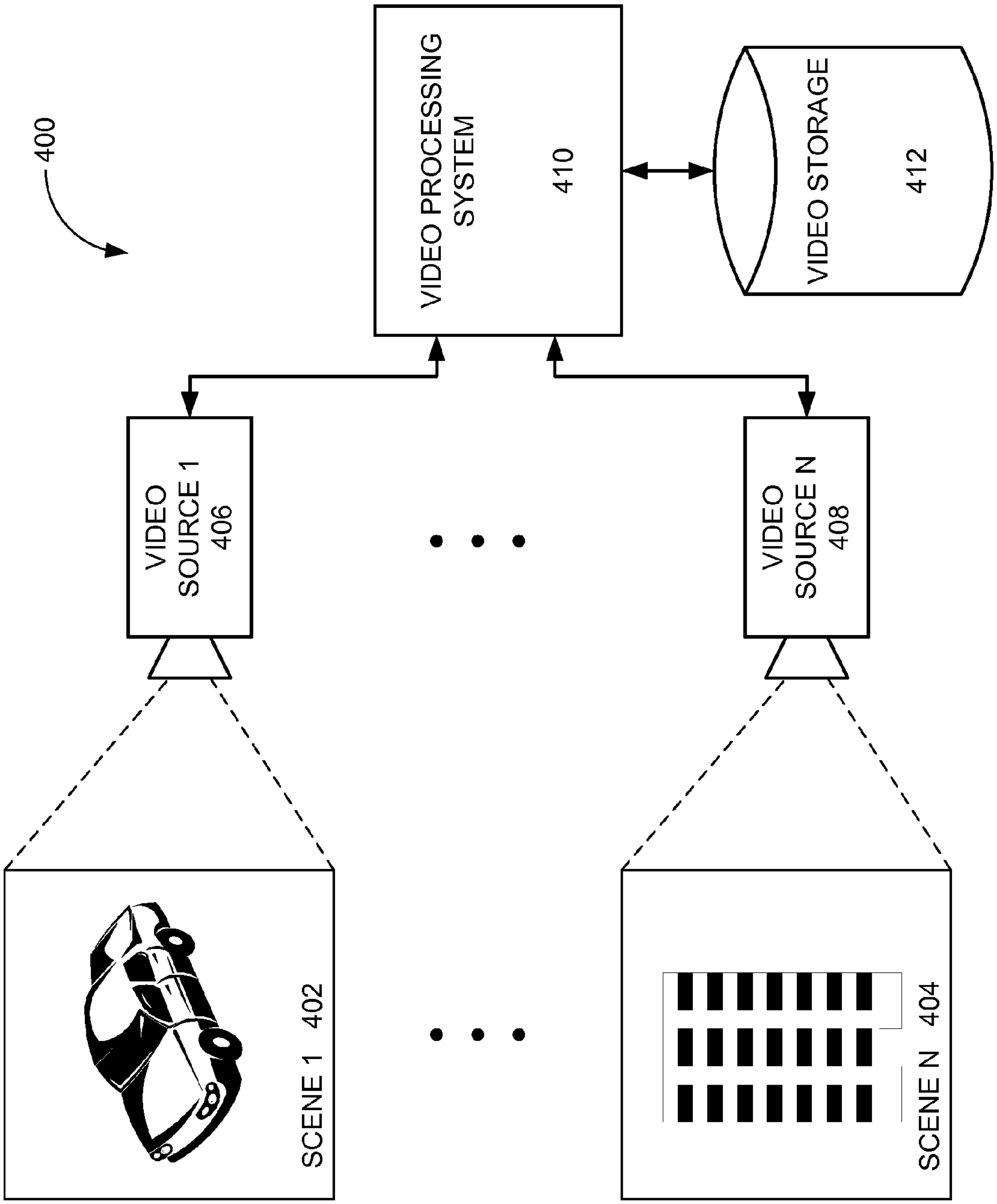
FIG. 4 illustrates a block diagram of an example of a video system.

Network interface 312 is configured to connect to external devices over network 315. In some examples these network devices may include video sources and video storage systems as illustrated in FIGS. 1 and 4. Input ports 313 are configured to connect to input devices 316 such as a keyboard, mouse, or other user information input devices. Output ports 314 are configured to connect to output devices 317 such as a display, a printer, or other output devices.

Processor 302 includes microprocessor and other circuitry that retrieves and executes operating software from memory devices 303. Memory devices 303 may include random access memory (RAM) 304, read only memory (ROM) 305, a hard drive 306, and any other memory apparatus. Operating software includes computer programs, firmware, or some other form of machine-readable processing instructions. In this example, operating software includes operating system 307, applications 308, modules 309, and data 310. Operating software may include other software or data as required by any specific embodiment. When executed by processor 302, operating software directs processing system 301 to operate video processing system 300 as described herein.

FIG. 4 illustrates a block diagram of an example of a video system 400. Video system 400 includes video source 1 406, video source N 408, video processing system 410, and video storage system 412. Video source 1 406 is configured to capture video of scene 1 402, while video source N 408 is configured to capture video of scene N 404. Video source 1 406 and video source N 408 are coupled to video processing system 410, and video processing system 410 is coupled to video storage system 412. The connections between the elements of video system 400 may use various communication media, such as air, metal, optical fiber, or some other signal propagation path—including combinations thereof. They may be direct links, or they might include various intermediate components, systems, and networks.

In some embodiments, a large number of video sources may each communicate with video processing system 410. This results in bandwidth concerns as video processing system 410 may have an input port which is not capable of receiving full resolution, real time video from all of the video sources. In such a case, it is desirable to incorporate some video processing functionality within each of the video sources such that the bandwidth requirements between the various video sources and video processing system 410 are reduced. An example of such a video source is illustrated in FIG. 2.

In FIG. 4, multiple video sources capture video of multiple scenes which correspond to each camera. In some instances, it is desirable to track an object, such as an individual person, object, or vehicle. It is often desirable to track that person, object, or vehicle as it moves between the various scenes which are covered by different cameras. A user of video processing system 410 may wish to view a contiguous video which effectively splices together the different pieces of video from the various video sources which contain the object of interest. If there are a large number of cameras, it may be very time consuming or processor intensive to search the video from each scene to see if the object entered the scene captured by that camera. In many cases, the video is stored in multiple storage elements.

Figure 5:
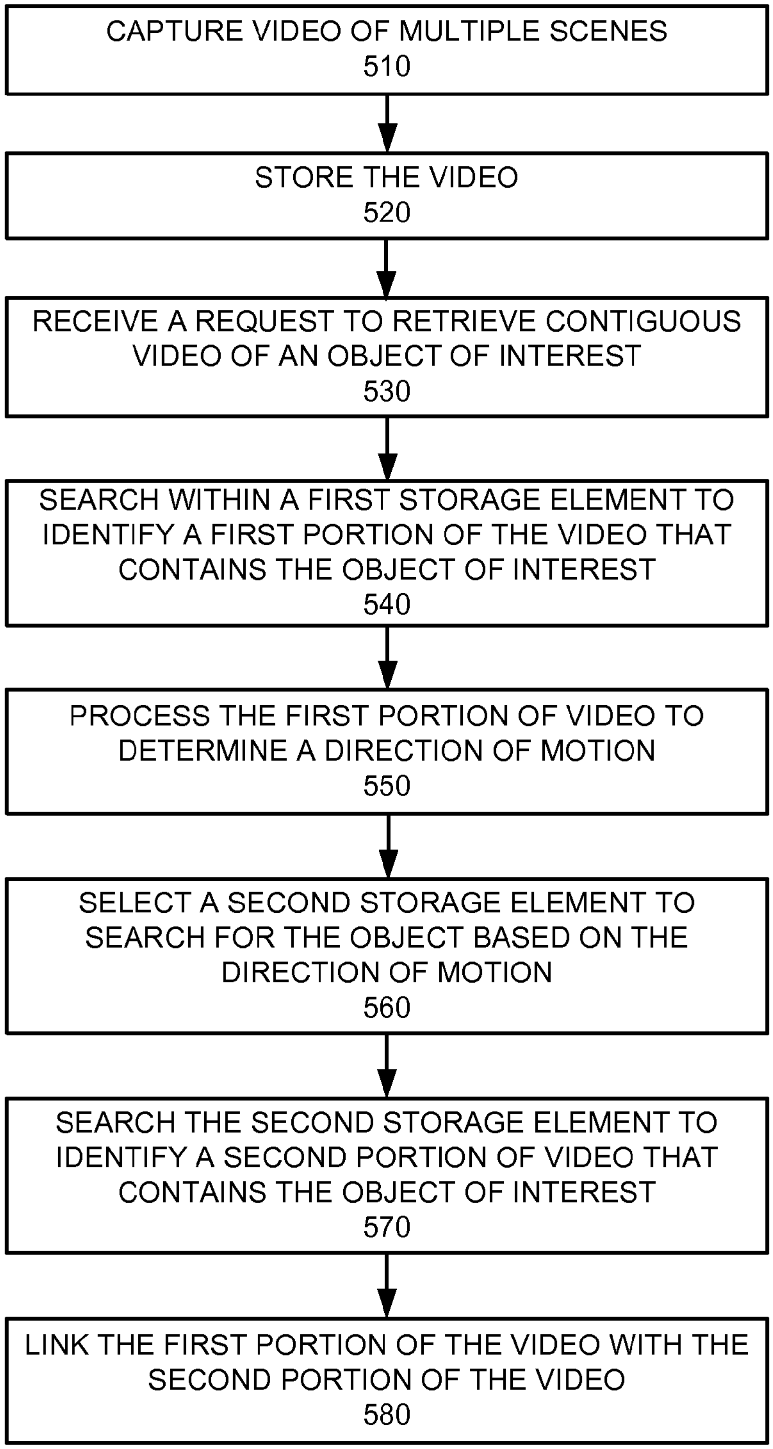
FIG. 5 illustrate a method of operation of a video processing system.

Instead of searching all of the stored video for the object, video processing system 410 utilizes a more effective method for searching for the object which is illustrated by FIG. 5. After the video of multiple scenes has been captured and stored (steps 510 and 520), video system 410 receives a request to retrieve contiguous video of an object of interest which has moved through at least two of the multiple scenes (step 530). Video system 410 then searches within a first storage element of the multiple storage elements to identify a first portion of the video that contains the object of interest (step 540). Then, video system 410 processes the first portion of the video to determine a direction of motion of the object of interest (step 550), selects a second storage element within which to search for the object of interest based on the direction of motion (step 560), and searches within the second storage element to identify a second portion of the video that contains the object of interest within a second scene (step 570). Finally, video system 410 links the first portion of the video with the second portion of the video to generate the contiguous video of the object of interest (step 580).

In a variation of the implementation discussed above, the process through which video system 410 selects the second storage element within which to search for the object of interest based on the direction of motion is further based on a probability of the object of interest appearing in the second scene. The probability information may be included in a scene probability table. In one example, the scene probability table could be based on spatial relationships between the multiple scenes. In another example, the scene probability table could be based on historical traffic patterns of objects moving between the scenes.

Figure 6:
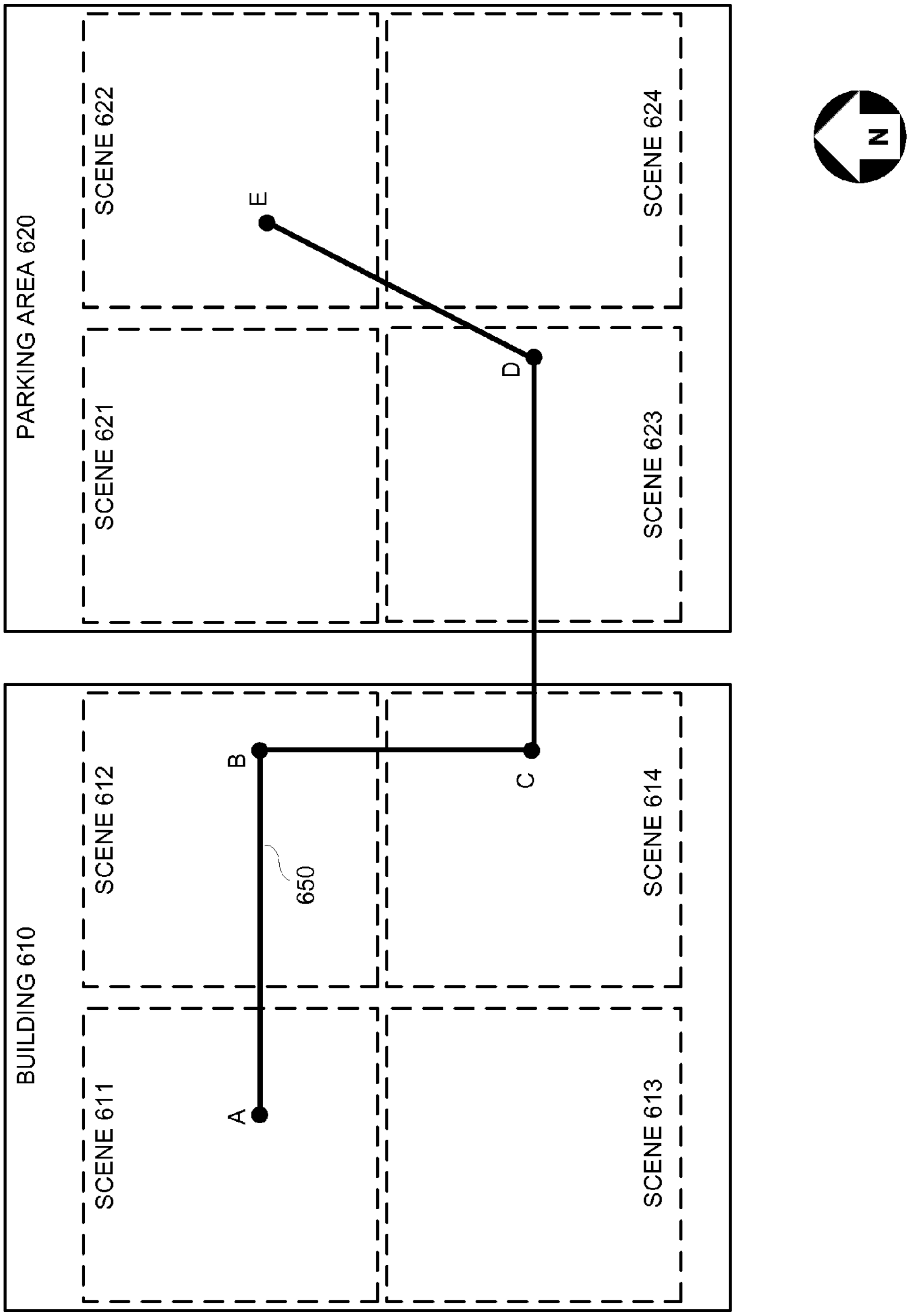
FIG. 6 illustrates the path of an object being monitored by a video system.

FIG. 6 illustrates the path of an object of interest being monitored by a video system in an area which is split into multiple scenes. The area being monitored includes the interior of building 610 and outdoor parking area 620. The scenes included in building 610 and parking area 620 are covered by multiple cameras due to the physical size of the areas, due to visual obstructions, or for other reasons. In this example, each area is covered by four cameras. In building 610, the scenes monitored by the four cameras are represented by scenes 611-614. The scenes monitored by the four cameras covering parking area 620 are represented by scenes 621-624. The resulting system is a system similar to that of FIG. 4 with eight video sources.

The video associated with the eight scenes is captured by cameras and sent to video processing system 410. Video processing system 410 stores the eight video streams in different storage elements of video storage 410. The entity responsible for managing the activities in the areas may wish to track people, objects, or vehicles as they move through building 610, parking area 620, and the various scenes associated with those areas. Path 650 illustrates an example path a person might take while walking through these various areas. The person started at point A on path 650, moved to the places indicated by the various points along path 650, and ended at point E.

The user of the video system may be interested in viewing a contiguous video showing the person's movement throughout all of path 650 as if the video existed in one continuous video stream. Because the video associated with each scene is stored in a separate storage element or file, it is not possible to view the movement of the person through path 650 by viewing a single portion of video stored in a single storage element. The video which the user is interested in viewing may be segments of video which are scattered across multiple different storage elements. In FIG. 6, the first video of interest would be the video associated with scene 611 because this is where the monitoring of the person begins. The user will be interested in watching the video associated with scene 611 until the person moves far enough along path 650 that he exits scene 611.

At this point in time, the user will want to begin viewing video associated with the next scene that person entered as he moved along path 650. It is advantageous to have a method of determining which video should be searched to locate the person rather than searching through the video associated with all the other seven scenes. Using the method provided here, this is accomplished by using a direction of motion to determine the next storage element in which to search for video containing the object of interest.

For example, the video from scene 611 would be processed to determine that the direction of motion of the person moving along path 650 is generally moving to the east. Since the direction of motion indicates the person is moving to the east, the best storage element to search for the person after he leaves scene 611 is the storage element containing video associated with scene 612 because it lies to the east of scene 611. The appropriate segments of video from scene 611 and scene 612 can be view together such that the user can see continuous or nearly continuous footage of the person moving from point A to point B. This eliminates the time, expense, and processing power of having to search the other video for the person.

Similarly, as the person is moving from point B to point C, a direction of motion for the person is determined. Since the direction of motion indicates the person is moving generally in a southern direction, the storage element containing video associated with scene 614 will be chosen as the next to search for the person when he leaves scene 612.

The method will also be effective if a person moves through an area where there is no video coverage. For example, as the person in FIG. 6 is moving from point C inside building 610 to point D in parking area 620 there may be an area near the exit of the building where there is no video coverage. As the person leaves scene 614, the method of determining a direction of motion of the object and determining the next storage element to search for video of the person will work the same as described above. The method will indicate that scene 623 should be searched next even though there may be a gap in time between when the person left scene 614 and when he entered scene 623. However, scene 623 is still associated with the next video in which the person will appear.

In some instances, the proximity of the person to the edge of a scene may also have to be taken into account, in addition to the direction of the motion, in order to properly choose the next storage element to search for video of the person. In FIG. 6, as the person moves away from point D, the direction of motion indicates he is moving in a northeast direction and the movement is more north than east. Taken alone, the fact that the direction of motion has a larger north component than east component might suggest that the next storage element to search would be that containing the video associated with scene 621. However, even though the movement is more north than east, the proximity of the person must be taken into account to determine what scene will be entered next. As the person leaves point D he is much closer to the eastern edge of scene 623 than to the northern edge. Therefore, considering both his position and the direction of motion will result in a conclusion that he will be leaving the eastern edge of scene 623. Therefore, he will be entering scene 624 next and the storage element associated with the video from scene 624 should be searched.

The process of searching subsequent video may be aided by use of timestamps. In FIG. 6, the person is included in the video associated with scene 623 while he is at point D. As discussed above, the video associated with scene 624 will be the next video searched when he leaves scene 623. As his image reaches the edge of scene 623, a time of exit, or timestamp, is identified based on a central timing mechanism used by the video system. This timestamp is used to more efficiently determine where within the video associated with scene 624 to begin searching for the person. If there are known gaps or unmonitored distances between two scenes, a delay factor may also be added to the timestamp to more accurately estimate when the person will appear in the next scene.

Figure 7:
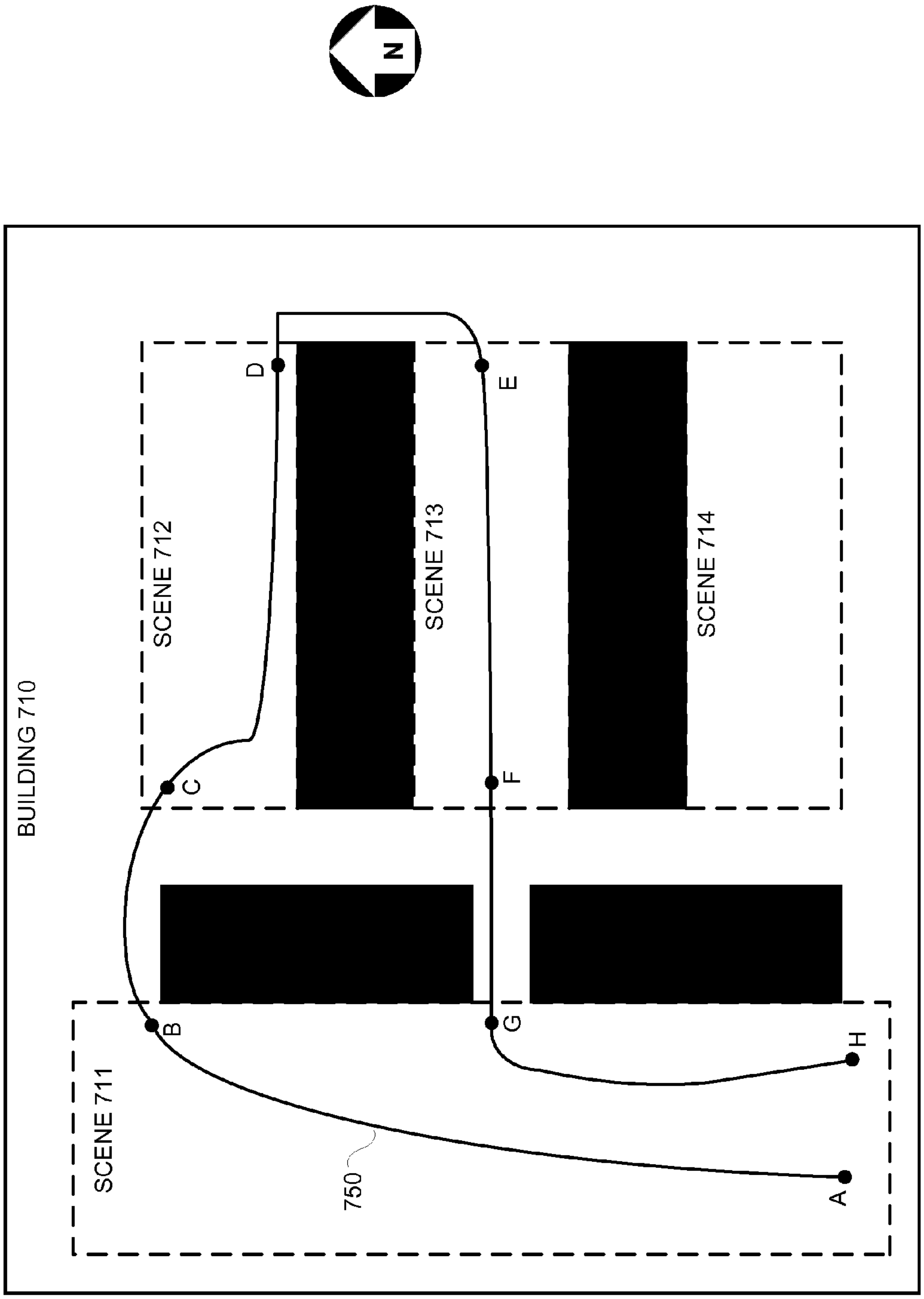
FIG. 7 illustrates the path of an object being monitored by a video system.

In some circumstances, it may not be possible to determine with certainty the next scene a person will enter. This may be due to the physical layout of the area being monitored, the fact that some areas may not have video coverage, or other reasons. For example, FIG. 7 illustrates the layout and video coverage of a retail shopping environment in building 710. The areas which receive camera coverage are illustrated by scenes 711-714. Path 750 illustrates the path a shopper takes as he walks through the store. It may not always be possible to determine with certainty the scene which a person walking through the store will enter next. In these situations, the previously described method of determining a direction of motion to select the next storage element in which to search for video of the person may also take into account the probability of the person appearing in a second scene.

When the shopper leaves point B in scene 711, he leaves in an easterly direction. However, the immediately adjacent area of the store is not covered by a camera. Therefore, it is not entirely clear which scene the shopper will eventually enter next. The shopper may enter scene 712 next or he may head south and scene 713, 714, or even return to scene 711 through an alternate path. However, it is likely that a significant percentage of shoppers will take the same route. A probability of the person going from one scene to another may be used in making the determination which storage element should be searched next.

The probabilities discussed above may be represented in the form of a scene probability table. A scene probability table lists the most likely subsequent scene a shopper will enter after he leaves a particular scene. For instance, as the shopper leaves scene 711 from point B, the scene probability table may indicate that scene 712 is the most likely next scene which he will enter. Based on this, the processing system will select the storage element associated with the video of scene 712 to search next to locate the shopper even though there are other possibilities. The scene probability table may be based on the physical layout of the environment being monitored, the spatial relationships between the scenes, historical traffic patterns of people or objects moving through the area, or other factors.

A similar situation occurs when the shopper is at point D and leaves scene 712. Because of the gap in coverage it cannot be determined with certainty what scene the shopper will enter next because he may go further south and enter scene 714. However, the scene probability table may indicate that the largest percentage of people who leave the east end of scene 712 enter scene 713 next. Therefore, the storage element associated with scene 713 will be selected and the associated video searched to locate the shopper. The point in the video to begin the search may be based upon use of a timestamp as discussed previously.

The scene probability table may also list multiple possible scenes which a person may enter next. For example, when the shopper is at point F and moving in a westerly direction, the scene probability table may indicate that the most likely scene which he will enter is scene 714 based on the historical traffic patterns of other shoppers. The scene probability table also contains additional entries indicating the next most likely scene to be entered.

In this case, the scene probability table may indicate that scene 711 may be the second most likely scene to be entered after leaving the west end of scene 713. The storage element containing the video associated with scene 714 may be searched first if it is listed first in the scene probability table. However, the shopper will not be found in that video and the next entry in the scene probability table would suggest that searching the storage element containing video associated with scene 711 would be the second most likely place to find the shopper.

A scene probability table may also be updated by the video system over time. The video system may periodically analyze the traffic patterns in the collected video and update the scene probability table based on the routes taken by the highest percentages of people as indicated by recent data. Preferred routes may change over time due to changes in a store layout, changes in merchandise location, seasonal variations, or other factors. In addition, the scene probability table may have to be updated when camera positions are changed and the scenes associated with those cameras change.

Sophisticated video surveillance systems are usually required to do more than simply record video. Therefore, systems should be designed to gather optimal visual data that can be used to effectively gather evidence, solve crimes, or investigate incidents. These systems should use video analysis to identify specific types of activity and events that need to be recorded. The system should then tailor the recorded images to fit the needs of the activity they system is being used for—providing just the right level of detail (pixels per foot) and just the right image refresh rate for just long enough to capture the video of interest. The system should minimize the amount of space that is wasted storing images that will be of little value.

In addition to storing video images, the system should also store searchable metadata that describes the activity that was detected through video analysis. The system should enable users to leverage metadata to support rapid searching for activity that matches user-defined criteria without having to wait while the system decodes and analyzes images. Ideally, all images should be analyzed one time when the images are originally captured and the results of that analysis should be saved as searchable metadata.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of searching for objects of interest within captured video, the method comprising:

capturing video of a plurality of scenes using video encoding;

storing the video in a plurality of storage elements, wherein video analysis to used to generate metadata during video encoding;

receiving a request to retrieve contiguous video of an object of interest that has moved through at least two scenes of the plurality of scenes;

in response to the request, searching within a first storage element of the plurality of storage elements to identify a first portion of the video that contains the object of interest within a first scene of the plurality of scenes;

processing the first portion of the video to determine a direction of motion of the object of interest;

selecting a second storage element of the plurality of storage elements within which to search for the object of interest based on the direction of motion of the object of interest and on historical traffic patterns of other objects moving between the scenes;

searching within the second storage element to identify a second portion of the video that contains the object of interest within a second scene of the plurality of scenes; and linking the first portion of the video with the second portion of the video to generate the contiguous video of the object of interest, wherein the metadata contains a history of instances captured by the camera.

2. The method of claim 1 wherein a timestamp in the first portion of the video is used to identify a location in the second portion of the video.

3. The method of claim 2 wherein the timestamp indicates a time at which the object of interest reaches an edge of the first scene.

4. The method of claim 1 wherein selecting the second storage element of the plurality of storage elements within which to search for the object of interest based on the direction of motion is further based on a probability of the object of interest appearing in the second scene.

5. The method of claim 4 wherein the probability of the object of interest appearing in the second scene is determined based on a scene probability table.

6. The method of claim 5 wherein the scene probability table is based on spatial relationships between the scenes which make up the plurality of scenes.

7. The method of claim 5 wherein the scene probability table is based on historical traffic patterns of objects moving between the scenes, and wherein the historical traffic patterns may be updated by determining a traffic pattern taken by a previously determined percentage of objects.

8. The method of claim 5 wherein the scene probability table is updated based in part on the video.

9. A video system comprising:

a storage system comprising a plurality of storage elements; and a video processing system configured to:

capture video of a plurality of scenes using video encoding;

store the video in the plurality of storage elements, wherein video analysis to used to generate metadata during video encoding;

receive a request to retrieve contiguous video of an object of interest that has moved through at least two scenes of the plurality of scenes;

in response to the request, search within a first storage element of the plurality of storage elements to identify a first portion of the video that contains the object of interest within a first scene of the plurality of scenes;

process the first portion of the video to determine a direction of motion of the object of interest;

select a second storage element of the plurality of storage elements within which to search for the object of interest based on the direction of motion of the object of interest and on historical traffic patterns of other objects moving between the scenes;

search within the second storage element to identify a second portion of the video that contains the object of interest within a second scene of the plurality of scenes; and link the first portion of the video with the second portion of the video to generate the contiguous video of the object of interest, wherein the metadata contains a history of instances captured by the camera.

10. The video system of claim 9 wherein a timestamp in the first portion of the video is used to identify a location in the second portion of the video.

11. The video system of claim 10 wherein the timestamp indicates a time at which the object of interest reaches an edge of the first scene.

12. The video system of claim 9 wherein the video processing system is further configured to select the second storage element of the plurality of storage elements based on a probability of the object of interest appearing in the second scene.

13. The video system of claim 12 wherein the probability of the object of interest appearing in the second scene is determined based on a scene probability table.

14. The video system of claim 13 wherein the scene probability table is based on spatial relationships between the scenes which make up the plurality of scenes.

15. The video system of claim 13 wherein the scene probability table is based on historical traffic patterns of objects moving between the scenes, and wherein the historical traffic patterns may be updated by determining a traffic pattern taken by a previously determined percentage of objects.

16. The video system of claim 13 wherein the scene probability table is updated based in part on the video.

17. A method of searching for objects of interest within captured video, the method comprising:

capturing and storing video of a plurality of scenes in a storage element using video encoding;

receiving a request to retrieve contiguous video of an object of interest that has moved through at least two scenes of the plurality of scenes, wherein video analysis to used to generate metadata during video encoding;

searching within the storage element to identify a first portion of the video that contains the object of interest within a first scene of the plurality of scenes;

processing the first portion of the video to determine a direction of motion of the object of interest;

searching within the storage element to identify a second portion of the video that contains the object of interest within a second scene of the plurality of scenes based on the direction of motion of the object of interest and on historical traffic patterns of other objects moving between the scenes;

linking the first portion and second portion of the video to generate the contiguous video, wherein the metadata contains a history of instances captured by the camera.

18. The method of claim 17 wherein a timestamp in the first portion of the video is used to identify a location in the second portion of the video.

19. The method of claim 18 wherein the timestamp indicates a time at which the object of interest reaches an edge of the first scene.

20. The method of claim 17 wherein searching within the storage element to identify a second portion of the video that contains the object of interest within a second scene of the plurality of scenes is further based on a probability of the object of interest appearing in the second scene.

21. The method of claim 20 wherein the probability of the object of interest appearing in the second scene is determined based on a scene probability table.

22. The method of claim 21 wherein the scene probability table is based on spatial relationships between the scenes which make up the plurality of scenes.

23. The method of claim 21 wherein the scene probability table is based on historical traffic patterns of objects moving between the scenes, and wherein the historical traffic patterns may be updated by determining a traffic pattern taken by a previously determined percentage of objects.

24. The method of claim 21 wherein the scene probability table is updated based in part on the video.

* * * * *